Feb. 17, 1942.  W. K. YOUNGBERG  2,273,549
OIL GAUGE
Filed Aug. 14, 1939
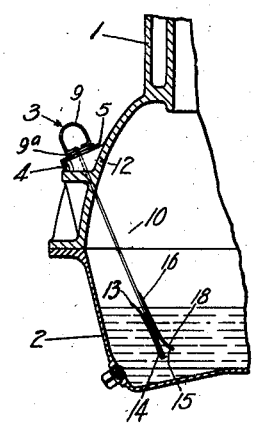
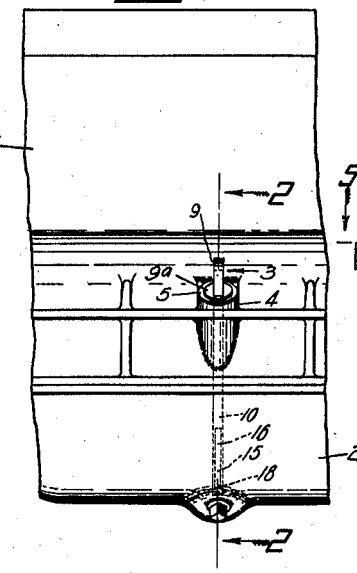
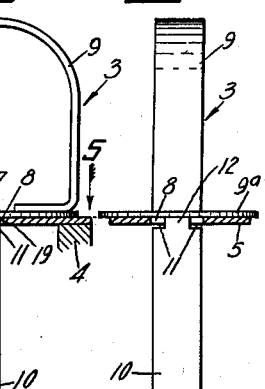
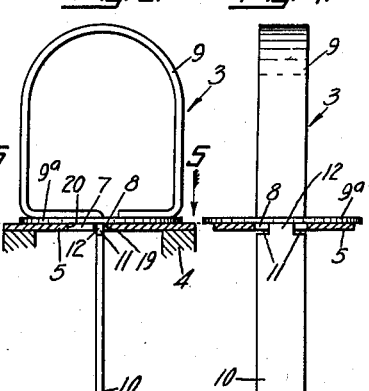
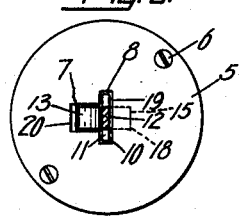
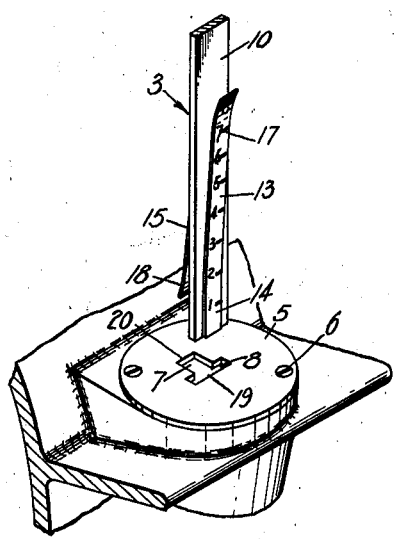
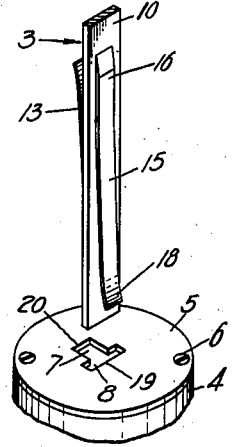
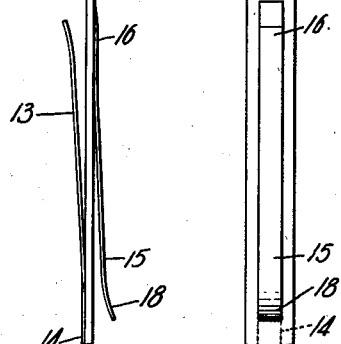
INVENTOR
Walter K. Youngberg
By
ATTORNEY Patented Feb. 17, 1942

2,273,549

UNITED STATES PATENT OFFICE 2,273,549

OIL GAUGE

Walter K. Youngberg, Meriden, Conn.

Application August 14, 1939, Serial No. 290,115

14 Claims. (Cl. 33—126.7)

My invention relates to oil gauges for engines or the like.

It has among its objects to provide an improved oil gauge construction whereby it is made impossible for a filling station attendant to insert the oil gauge part way in an automobile crank-case and thereupon withdraw the same in such manner as to obtain a false indication as to the level of the oil therein, as a basis for a further sale of engine oil. Another object of my invention is to provide such an improved construction wherein, through improved cooperating mechanism on the oil gauge and the crank-case, it is made necessary for the attendant, upon inserting the oil gauge, to insert the same to full depth in the crank-case in order to be able to withdraw the gauge. A further object of my invention is to provide such improved cooperating means whereby, while enabling the gauge to be inserted with facility to full depth, when thus inserted it may be readily and quickly removed following a simple rotative movement of the same in the crank-case aperture. Other objects include the provision of an improved gauge member having improved means thereon adapted to require insertion of the gauge in a predetermined relation in the crank-case and the withdrawal of the gauge in another predetermined relation thereto, and the provision of improved cooperating means on the crank-case cooperating with the above mentioned means and requiring both a full insertion of the gauge and a rotary movement thereof when fully inserted, in order to permit the same to be withdrawn. These and other objects and advantages of my improvements will, however, hereinafter more fully appear.

In the accompanying drawing, I have shown for purposes of illustration certain embodiments which my invention may assume in practice.

In the drawing:

Figure 1 is a side elevation of a portion of an engine equipped with my improvement, my improved removable gauge member being shown in dotted lines in the crank-case;

Fig. 2 is a sectional view on line 2—2 of Figure 1;

Fig. 3 is an enlarged sectional view of the gauge member and its cooperating controlling structure on the crank-case;

Fig. 4 is a like view showing the gauge member as seen from the right in Figure 3;

Fig. 5 is a section on line 5—5 of Figure 3;

Fig. 6 is a detail perspective view showing the gauge member in process of being correctly inserted in the crank-case, the upper end of the gauge member being broken away to facilitate illustration;

Fig. 7 is a view similar to Figure 6, but showing the gauge member reversed and after withdrawal from the crank-case, and Fig. 8 is a detail plan view showing a modified construction.

In the illustrative construction shown in Figures 1 to 7, I have illustrated my invention applied to a suitable engine, generally indicated at 1, as, for example, an automobile engine having a crank-case 2 beneath the same and a gauge member, generally indicated at 3, insertable in a usual manner through an apertured boss 4 on the crank-case to determine the oil level therein; improved means being provided herein for incuring that the member 1 is inserted to full depth into the crank-case, all as hereinafter further described.

My improved construction herein includes improved gauge controlling means carried on the crank-case through which my improved gauge member is insertable in a predetermined relation and only withdrawable in a different predetermined relation. These means include an improved cover 5 for the apertured boss 4 suitably attached thereto or formed thereon. Herein, this cover is in the form of a disc suitably attached, as by peripheral screws 6, to the periphery of the boss in any suitable manner and having improved gauge member controlling aperture means provided through the axis thereof. More particularly, this means herein includes communicating apertures 7 and 8, both of generally rectangular shape and with the aperture 7 deeper than the aperture 8 and the latter wider than the aperture 7 and communicating with one end thereof at a point midway betwen one of the elongated sides of the aperture 8. Thus, the two apertures 7 and 8 cooperate to form a substantially T-shaped aperture having a relatively narrow cross bar portion and a relatively wide base portion disposed at right angles to this cross bar portion and centrally of the latter. In practice, where the cover is in sloping position on a crank-case as shown, the aperture 8 is disposed longitudinally of the car and toward the attendant.

Cooperating with this improved structure is also improved cooperating means on my improved gauge member 3. Herein, this member has a usual handle 9 on its upper end, a supporting disc 9a below the handle and a flat depending body portion 10 adapted to be inserted into the crank-case and to extend down into the oil therein in a usual manner. Herein, however, it will be observed that between the handle 9 and this portion 10 and closely adjacent the bottom of the handle 9, improved structure is provided on the member 10 enabling it to cooperate in an improved manner with the apertures 7 and 8 heretofore described. In this illustrative construction, oppositely disposed rectangular notches 11 of equal size are cut out of the opposite sides of this portion 10 in such manner as to leave a narrow portion 12 connecting the body of the portion 10 to the handle portion thereof. Further, it will be observed that while the body of the portion 10 is of substantially the same width as the aperture 8 while being freely slidable therein, this portion 10 is thinner than the aperture 8 while the portion 12 thereon between the notches 11 is of such width as to be freely rotatable in the adjacent portions of the apertures 7 and 8 when disposed in the plane thereof. Thus, while the member 3 can move downward in the slot or aperture 8 when its portion 10 is inserted therein, and this portion 10 cannot be rotated while thus being moved downward or while any full width portion thereof is opposite the apertures 7, 8, it will be evident that when this member 3 is in its full down position, shown in Figures 3, 4 and 5, its portion 12 can then be rotated freely in the adjacent portions of the apertures 7 and 8 in such manner as to enable the member 3 to be rotated through 180°.

Cooperating with my improved cooperating structure on the cover 5 and at the upper end of the gauge member 3, above described, is also improved cooperating structure on the lower end of the portion 10. Herein, this structure includes an upwardly extending gauging member 13, herein suitably attached at its bottom end 14 to one face of the portion 10, and at the bottom thereof, and a downwardly extending cooperating member 15 suitably attached at its upper end, as at 16, to the opposite face of the portion 10, herein at a point substantially spaced above the lower end of the portion 10. Herein, each of these members 13 and 15 is substantially narrower than the portion 10 and centrally located thereon and preferably formed of spring steel. It will also be noted that each is also of substantially the width of the aperture 7 and adapted to move longitudinally through the latter, while each is also of such thickness as with the portion 10 to be freely movable in the slot or aperture 8 when disposed on the opposite side of the portion 10 from the aperture 7 in reverse positions of the member 3, as hereinafter described. Attention is also directed to the fact that each of the same has its free end biased away from the member 10, so that these oppositely disposed members have their opposite ends normally out of contact with the member 10, the member 13 being thus spaced at its top and the member 15 at its bottom. Attention further is directed to the fact that the so-called gauging member 13 has suitable gauge marks 17 on its outer face to indicate the level of the oil in the crank-case, and also has its free end so spaced from the member 10 that the surface bearing these gauge marks will be wiped by the walls 19 of the aperture 8 when the member 3 is inserted between the portion 10 and this wall 19, but will not be wiped by the wall 20 of the aperture 7 when, after the member 3 has been turned through 180° in the full down position of the gauge, as above described, the member 3 is then withdrawn. The member 15, on the other hand, herein has its lower end 18 spaced above the bottom extremity of the member 10, and this end 18 is also preferably permanently bent outward, or rounded slightly, as shown, so that the portion 10 and this permanently bent end 18 cannot enter the aperture 8 from above, although not so far bent out that it cannot enter through the aperture 7 or be drawn freely out through the aperture 8 in a reverse position of the member 3.

In the use of my improved construction, when a car equipped with my improvement is to have its oil measured, the gauge member 3 can be readily withdrawn from its full down position shown in Figure 3, when the parts are in the relation shown in Figure 7, by merely pulling it outward. However, instead of requiring manual wiping before return, upon merely turning it 180°, i. e. into the relation shown in Figure 6, its gauging member 13 will be wiped clean by the surface 19 while the member 3 is also readily inserted in the crank-case. More particularly, the portion 10 is then inserted in the aperture 8, with the member 13 then having its lower connected end entering first and the remainder of the member 13 being pressed against the portion 10 to permit free passage through the slot 8 between the portion 10 and the wall 19 of slot 8, and the spring member 15 then having its spaced end passing freely through the aperture 7. Obviously, after the upper end of the spring member 13 has passed below the cover 5, this end will be released and spring out under the cover, in such manner as to prevent a mere withdrawal of the member 3. Thus, the operator cannot push the member 3 down only partway and then pull it out, in such manner as to show the need of oil, as, due to this engagement of the end of the member 13 with the cover, he cannot withdraw the gauge. Instead, he has to push it down all the way and turn the member 3 through 180°, i. e. into the relation shown in Figure 7. However, if the operator pushes the member 3 into its full down position, i. e. brings the portion 12 thereon opposite the apertures 7 and 8, he can then rotate the member 3 through 180° into the relation shown in Figures 3 and 7 in such manner as to enable the member 3 to be readily withdrawn. More specifically, such rotation brings the parts into the relation shown in Figure 7, i. e. brings the member 13 under the aperture 7 so that it may be freely withdrawable therethrough, while the member 15 is also disposed on the opposite side of the portion 10 in such manner as to be readily compressed inwardly by the wall 19 while being withdrawn through the aperture 8. Here it will also be noted that the gauging member 13 not being wiped by the surface 20 during this withdrawal, the correct oil level will clearly appear on this member 13.

As a result of my improved interlocked construction, it will be observed that fraudulent manipulation of the gauge is thus effectually prevented, at the same time that an honest attendant is enabled to insert and remove the gauge with marked facility. It will also be noted that the provision of the cut back and permanently bent end 18 of the member 15 spaced above the lower end of the portion 10 also acts effectually to prevent the insertion of the gauge in the wrong position from the top, the permanently bent end 18 being so stiff that if the attendant attempts to press the body of the member 15 against the portion 10 he cannot press the end 18 flat enough, due to the permanent bend therein, to permit insertion from above. Further, his fraudulent efforts to do so of course would require not only the use of both hands, but the use of a tool in such manner as immediately to attract the buyer's attention. It will also be observed that, due to the notches 11, one or the other bottom shoulders formed thereby in the portion 10 will underlie the edges of the apertures 7 and 8, in such manner as to prevent withdrawal of the gauge if the same is in an incorrect angular position for withdrawal, thus acting to insure that the gauge will be returned to the relation shown in Figure 7 before withdrawal, it being understood that this position is suitably indicated by proper markings on the disc 9a and the cover 5. Through locating the aperture 8 and its wall 19 longitudinally of the engine and toward the attendant as described, it will also be noted that an obvious starting point is provided and that any tendency for the member 3 to shift objectionably when the car is in use, is also minimized. Attention is further directed to the fact that my improved construction is such that it may be applied to original equipment without appreciably increasing the expense thereof, while the special cover and gauge member may also be sold as accessories and inexpensively attached to existing equipment. These and other advantages of my improvements will, however, be clearly apparent to those skilled in the art.

While the construction shown in Figures 1 to 7 is an inexpensive form adapted for general use, I prefer to associate improved control mechanism with the supporting disc 9a, as shown in Figure 8. In this construction, a countersunk portion 21 is provided in the cover 5 in such manner as to provide a bearing surface for the disc 9a and a relatively deep wall 22 surrounding this disc. In this construction, the countersink 21 is also preferably slightly larger in diameter than the disc 9a and eccentrically disposed with respect thereto in such manner as, while making it possible to permit free movement of the intermediate portion 12 in the communicating apertures 7 and 8, to minimize such relative lateral displacement of the gauge member 3 as might cause objectionable catching preventing ready withdrawal of the gauge 3, and also act to guide and direct the disc 9a toward the correct withdrawing position shown in this figure. In this construction, also, in addition to markings on the cover 5, stops 23 and 24 spaced 180° from each other are provided on this cover to cooperate with a cooperating stop 25 on the handle 9.

While I have in this application specifically described certain forms which my invention may assume in practice, it will be understood that the same are shown for purposes of illustration and that the invention may be modified and embodied in various other forms without departing from its spirit or the scope of the appended claims.

What I claim as new and desire to secure by Letters Patent is:

1. In an oil gauge device, an elongated gauge member, a gauge receiving member having an aperture through which said gauge member is insertable in one angular position of said members relative to each other, and interlocking mechanism on said members for requiring, after an initial insertion of said gauge member in said aperture to a predetermined depth, the insertion of said gauge member to full depth before permitting withdrawal and longitudinal separation thereof in another angular position, including abutments on said receiving member and gauge member movable into obstructing relation with one another after said initial depth insertion and also including means preventing the movement of said gauge member into said other angular position unless and until said gauge is inserted to its full depth.

2. In an oil gauge, a gauge rod, a gauge receiving member having an aperture through which said rod is longitudinally insertable, and interlocking means governing the insertion and withdrawal of said rod including cooperating abutting surfaces on said rod and receiving member requiring insertion of the rod in one angular position thereof relative to said member and withdrawal thereof in another angular position and cooperating abutting surfaces on said rod and receiving member requiring, after an initial insertion of said rod to a predetermined depth, longitudinal insertion of the latter to full depth before permitting such angular movement from said position of insertion to said position of withdrawal.

3. In an oil gauge device, an elongated gauge member, a gauge receiving member having an aperture through which said gauge member is insertable, interlocking mechanism on said members for requiring, after an initial insertion of said gauge member in said aperture to a predetermined depth, the insertion of said gauge member to full depth before permitting withdrawal and longitudinal separation thereof, including abutments on said receiving member and gauge member movable into obstructing relation with one another after said initial depth insertion and also including means for enabling the abutment on said gauge member to be movable into freely longitudinally withdrawable relation with said aperture only at said full depth, and means for wiping a portion of said gauge member during insertion thereof and for leaving the same unwiped during withdrawal thereof.

4. In an oil gauge, a gauge member having a depending portion and controlling members attached thereto on opposite sides of said depending portion, one of said controlling members having its upper end connected to said gauge member and the other having its lower end connected thereto and each having its free end extended laterally away from said gauge member, a receiving member having means cooperating with said controlling members and apertured to receive said gauge member in only one angular relation of said gauge and receiving members, and means on said members for enabling a change in angular relation between said gauge member and receiving member only upon insertion of said gauge member to a predetermined depth.

5. In an oil gauge, an elongated gauge member having a depending portion and resilient controlling members attached thereto on opposite sides of said depending portion, one having its upper end connected to said depending portion and the other having its lower end connected thereto and each having its free end extended laterally away from said depending portion, and a receiving member having means including cooperating communicating slots cooperating with said controlling members to receive said gauge member in only one angular relation of said gauge member and receiving member and having abutments engaging with one of said controlling members only enabling withdrawal of said gauge member in another angular relation thereof.

6. In an oil gauge, a gauge member having a depending portion and controlling portions attached thereto on opposite sides of said depending portion, one having its upper end connected to said depending portion and the other having its lower end connected thereto and each having its free end extending laterally away from said depending portion, and a receiving member having means cooperating with said controlling portions and apertured to receive said gauge member in only one angular relation of said gauge member and receiving member and having abutments only enabling withdrawal of the same in another angular relation thereof, said gauge member having a notched portion adjacent the upper end of said depending portion enabling rotation of said gauge member into said last mentioned relation only when said member is inserted to full depth.

7. An oil gauge member having a depending portion, and resilient controlling members extending longitudinally of said portion on opposite sides thereof, one having its upper end connected to said depending portion and the other having its lower end connected thereto and each having its free end biased away laterally from said depending portion.

8. An oil gauge member having a depending portion, and resilient controlling portions extending longitudinally of said portion on opposite sides thereof, one having its upper end connected to said depending portion and the other having its lower end connected thereto and each having its free end biased away laterally from said depending portion, each of said resilient controlling portions being narrower than said depending portion.

9. An oil gauge member having a depending portion, and resilient portions extending longitudinally of said portion on opposite sides thereof, one having its upper end connected to said depending portion and the other having its lower end connected thereto and each having its free end extended away laterally from said depending portion, the resilient portion having its free end nearer the lower end of said depending portion also having said free end terminated short of the lower end of said depending portion.

10. An oil gauge member having a depending portion, and resilient portions extending longitudinally of said portion on opposite sides thereof, one having its upper end connected to said depending portion and the other having its lower end connected thereto and each having its free end biased away laterally from said depending portion, the resilient portion which has its biased end nearer the lower end of said depending portion also having a further laterally projecting permanently bent portion on said biased end.

11. An oil gauge member having a depending portion, resilient portions extending longitudinally of said portion on opposite sides thereof, one having its upper end connected to said depending portion and the other having its lower end connected thereto and each having its free end extended away laterally from said depending portion, and said depending portion adjacent the end thereof remote from said resilient portions having notches in opposite side edges of said depending portion forming an intermediate reduced portion thereon.

12. In an oil gauge, a gauge member, a member through which the latter is insertable, cooperating means on said members for requiring insertion of said gauge member in a predetermined relation of said members and permitting withdrawal of said gauge member only after said gauge member has been inserted to full depth and moved angularly into another predetermined relation of said members, said means including controlling portions extending longitudinally of said gauge member on opposite sides thereof, one having its upper end connected to said gauge member and the other having its lower end connected thereto and each having its free end extended laterally away from said depending portion, and cooperating means on said members for locating said gauge member in either angular relation.

13. In an oil gauge, an elongated gauge member, a member having an aperture through which the latter is insertable into a liquid to be gauged, cooperating means on said members for requiring insertion of said gauge member in a predetermined axial rotational relation of said members and permitting withdrawal of said gauge member only in another predetermined axial rotational relation of said members, said means including controlling portions extending longitudinally of said gauge member on opposite sides thereof, one having its upper end connected to said gauge member and the other having its lower end connected thereto and each having its free end extended laterally away from said depending portion, said gauge member carrying a rotatable supporting member fixed thereto and said second mentioned member having guiding means for said supporting member directing the latter into said different angular relations when said gauge member is rotated in said aperture.

14. In an oil gauge, a cover member having a marginal portion and an annular countersunk portion eccentrically disposed relative to said cover member, and also having communicating apertures in said countersunk portion disposed eccentrically with respect to said countersunk portion and through which a gauge member is insertable, and gauge member engaging abutments oppositely located with respect to one another on said marginal portion.

WALTER K. YOUNGBERG.